3,385,258
LUMINAIRE HAVING LEVEL INDICATOR
Paul J. Curtin, and John Munagian, South Milwaukee, Wis., assignors to McGraw-Edison Company, Milwaukee, Wis., a corporation of Delaware
Filed Jan. 16, 1967, Ser. No. 609,627
9 Claims. (Cl. 116—114)

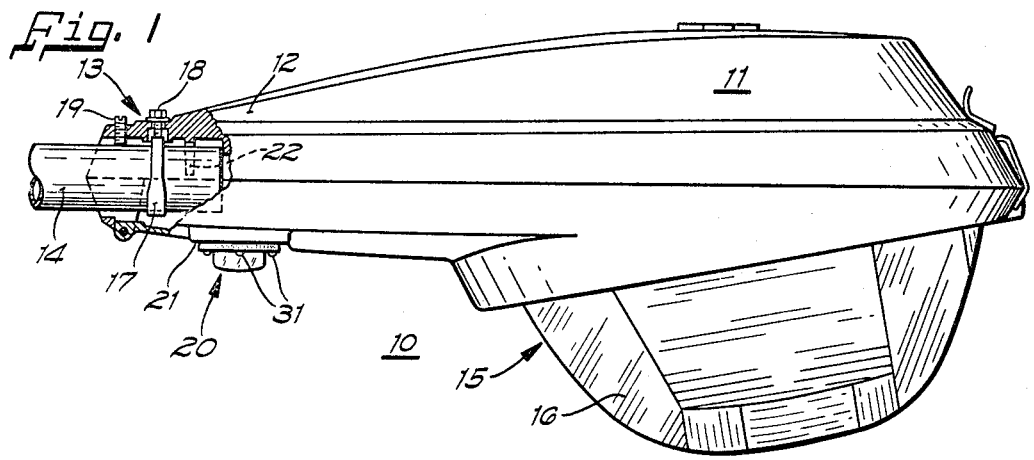
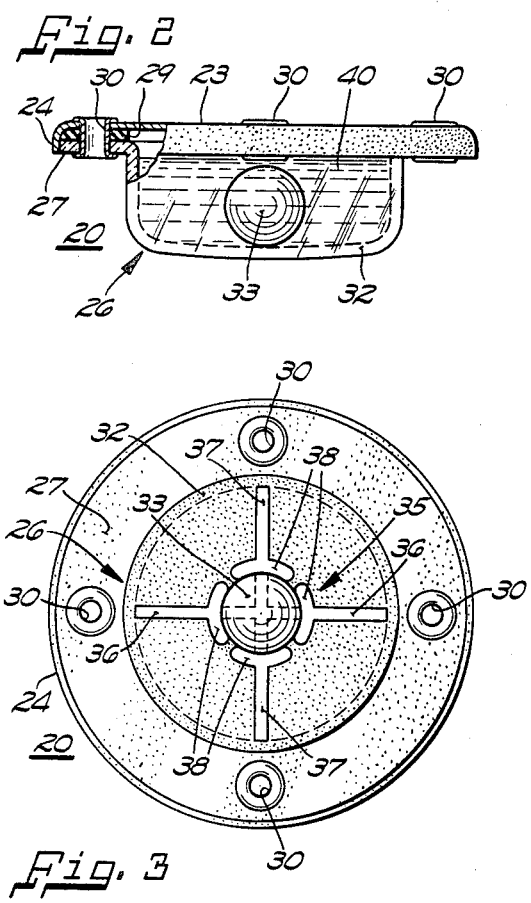
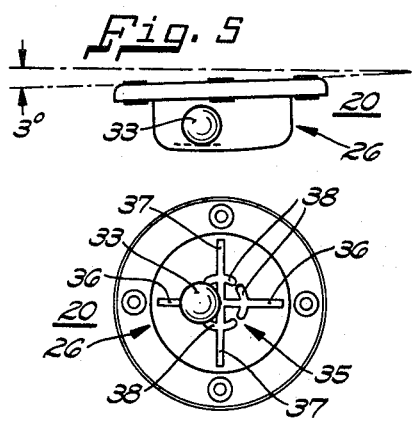
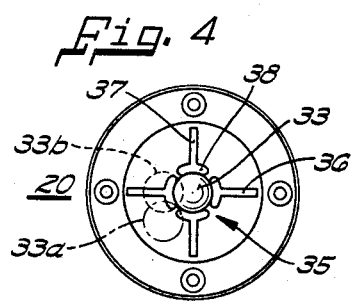
Inventors.
Paul J. Curtin
John Munagian
By Fred Wirutt
Attorney

United States Patent Office 3,385,258
Patented May 28, 1968

ABSTRACT OF THE DISCLOSURE

An outdoor luminaire having leveling means and a level indicator including an indicia bearing plate mounted below the luminaire and supporting a transparent container whose lower end is a spherical section. Disposed within the container is an indicator ball and a colorless dampening fluid having a freezing point substantially below that of water and a specific gravity substantially less than that of said indicator ball.

Background of the invention

Outdoor luminaires are generally provided with optical assemblies for generating a predetermined light pattern which is obtainable only if the luminaire is mounted in a substantially level position. This is a particularly important consideration in roadway illumination where an improperly leveled luminaire can result in dangerous glare and will not properly coordinate with adjacent luminaires to provide the desired overall generally uniform lighting pattern. Once prior art luminaires have been mounted, it was difficult to determine if they had been properly installed in a level position.

Summary of the invention

The invention comprises a level indicator for use with an outdoor luminaire and including a transparent container means having a lower surface which is curvilinear in any vertical cross-section for supporting a spherical indicator and a dampening fluid having a lower specific gravity than said indicator.

Brief description of the drawings

FIG. 1 shows an outdoor luminaire having a level indicator according to the instant invention;

FIG. 2 is a side elevational view, with parts broken away, of the level indicator according to the invention;

FIG. 3 is a bottom view of the level indicator shown in FIG. 2;

FIG. 4 shows the various positions of the level indicator during a luminaire leveling operation; and FIGS. 5 and 6 show the level indicator position with a 3° tilt.

The preferred embodiment of the invention

FIG. 1 shows an outdoor luminaire or lighting fixture 10 which includes an inverted, generally ovate housing 11 having an elongate portion 12 integrally formed at one side for housing a slipfitter assembly 13 which permits attachment of the luminaire to a generally horizontally extending, elongate support pipe 14. The other end of the pipe 14 may be affixed adjacent the upper end of a vertical support pole (not shown).

It will be appreciated by those skilled in the art that an ovate reflector (not shown) may be disposed within the housing 11 for reflecting light rays in a generally downward direction, as viewed in FIG. 1, whereupon they may be further modified by a cooperating refractor 15. The refractor 15 may have a plurality of variously shaped prisms 16 formed thereon and which cooperate with the reflector (not shown) to provide a predetermined desired light pattern on the ground below. This predetermined desired light pattern is obtainable, however, only if the luminaire 10 is mounted in a level position.

Leveling of the luminaire 10 may be accomplished by means of the slipfitter 13 which permits adjustment of the luminaire 10 about longitudinal and transverse axes relative to the pipe 14. More specifically, the slipfitter assembly 13 includes a U-clamp 17 which embraces the pipe 14 and is threadably engaged by a pair of bolts 18 passing through suitable apertures in the upper end of the housing portion 12. In addition, an adjusting screw 19 extends through a suitable threaded hole in the housing portion 12 and radially engages the pipe 14 on one side of the clamp 17 while an abutment surface 22 integrally formed on the housing portion 12 engages the pipe 14 on the other side of the clamp 17. For a more complete description of the luminaire slipfitter 13, reference is made to copending application Ser. No. 495,219, filed Oct. 12, 1965, and assigned to the assignee of the instant invention.

The level indicator 20, according to the instant invention, is suitably mounted on a planar surface 21 formed beneath the luminaire 10 as an aid in leveling and to permit a visual determination from ground level that the luminaire has been properly leveled.

As seen more specifically in FIGS. 2 and 3, the level indicator 20 includes a circular support plate 23 having an annular downwardly extending peripheral rim 24. In addition, a transparent generally cup-shaped member 26 is mounted below the plate 23 and has an outwardly extending peripheral flange 27 which is generally co-radial with the plate 23.

An annular gasket 29 may be disposed between the plate 23 and the flange 27 to seal the member 26 to the plate 23 and the assembly may be secured in any suitable manner such as by eyelets 30 which extend through suitable aligned apertures formed in the plate 23, the flange 27 and the gasket 29. The eyelets 30 may also receive screws 31 for securing the level indicator 20 to the luminaire 10, as seen in FIG. 1.

The lower end 32 of the cup-shaped member 26 is a spherical section for supporting a spherical indicator ball 33. Level indicia in the form of a target 35 may be applied to the lower surface of the plate 23 for cooperating with the indicator ball 33. It will be appreciated that the target 35 could also be applied to the lower end 32 of the member 26. The target 35 comprises a first line 36 which extends in a direction generally parallel to the longitudinal adjustment axis of the luminaire 10 and a second line 37 which is normal to the first line 36 and which is generally parallel to the luminaire's transverse adjustment axis. In addition, the target 35 includes a plurality of arcuate segments 38 applied in an opposed relation to each of the lines 36 and 37 and spaced from their intersection a distance equal to the radius of the indicator ball 33.

The member 26 is substantially filled with a clear dampening fluid 40 so that the indicator ball 33 will not be in continuous motion as the result of vibrations in the luminaire support pole (not shown). The fluid 40 preferably should have a freezing point substantially lower than water and must have a lower specific gravity than the indicator ball 33 so that the latter will not float. In addition, there must be no chemical activity between the fluid 40 and the ball 30 or the member 26. The fluid 40 should also preferably have a substantially constant viscosity over the expected operating temperature range. For example, materials found to be suitable for indicator 20 were a mixture of 70% glycerol and the balance deionized water for the fluid 40 and Teflon for the indicator ball 33.

To improve visibility of the components of the indicator 20 from ground level, the plate 23, the indicator ball 33 and the target 35 are preferably of contrasting colors.

When the luminaire 10 is level, the indicator ball 33 will be centered between the segments 38, as seen in FIG. 3. However, when the luminaire is being installed and before it is level, the bolts 18 of slipfitter 13 will be relatively loose and the ball 33 will be displaced from the center of the indicator 20, as shown by 33a in FIG. 4. The luminaire is then rotated about its longitudinal adjustment axis until the indicator ball 33 moves onto the longitudinal adjustment line 36 as shown by 33b in FIG. 4. The bolts 18 are then tightened to clamp the luminaire 10 in its adjusted position relative to its longitudinal adjustment axis and against the adjustment screw 19 and the abutment surface 22.

The luminaire 10 is leveled about its transverse adjustment axis by turning the adjustment screw 19 to pivot the luminaire 10 on the pipe 14 and about the abutment surface 22 as a fulcrum. As the luminaire is adjusted about its transverse axis the indicator ball will move along the line 36 to its centered position 33 relative to the segments 38 wherein the luminaire 10 is leveled.

FIGS. 5 and 6 illustrate how the target segments 36 may be employed to indicate when the luminaire is leveled within permissible limits. For example, if such limits are within 3° of horizontal, as shown in FIG. 5, the indicator 20 may be so proportioned that the indicator ball 33 will lie on the circle defined by the segments 38, as seen in FIG. 6.

While the level indicator according to the invention has been discussed with respect to a roadway luminaire, it will be appreciated that it has application with other types of apparatuses wherein a visible indication of a level position is desired from a remote position below. In addition, while only a single embodiment of the invention has been described, other modifications will become apparent to those skilled in the art once the inventive concept is known. It is, accordingly, intended that the invention be limited only by the scope of the appended claims.

We claim:
1. For use with an outdoor luminaire the combination of a level indicator comprising generally horizontal support means, container means depending from and secured to said support means and having a lower surface which is curvilinear in any vertical cross-section, spherical indicator means freely mounted in said container means for rolling movement on said lower surface, and dampening fluid means disposed in said container and having a specific gravity substantially lower than that of said indicator means, said container means being transparent and said support means being adapted for being mounted relative to said luminaire so as to make said spherical indicator means visible from below said luminaire, whereby said level indicator may be viewed from below said luminaire to give visual indication as to whether said luminaire is mounted in a level position.

2. The device set forth in claim 1 wherein said support means comprises a plate member and said container means forms a sealed enclosure therewith.

3. The device set forth in claim 1 wherein said container means is generally cup-shaped and the lower surface thereof is a spherical section.

4. The device set forth in claim 1 wherein said dampening fluid is clear.

5. The device set forth in claim 2 wherein said dampening fluid is clear and wherein said fluid has a freezing temperature substantially lower than that of water.

6. The device set forth in claim 1 in combination with a said luminaire which includes means for securing said luminaire to a substantially horizontal support member and for leveling said luminaire about transverse and longitudinal adjustment axes relative to said support member.

7. The device set forth in claim 6 wherein said indicia means is formed on one of the lower surfaces of said support means and said container means and extends in directions parallel to said longitudinal and transverse adjustment axes.

8. The device set forth in claim 7 wherein said indicator means, the lower surface of said support means and said indicia are of contrasting colors.

9. The device set forth in claim 8 wherein said support means is a plate member and said container means is generally cup-shaped with the lower surface thereof being a spherical section, and wherein said container means forms a sealed enclosure with said plate member, said dampening fluid being clear and having a freezing point substantially lower than that of water.

References Cited
UNITED STATES PATENTS

| | | | |
|---|---|---|---|
| 996,106 | 6/1911 | Means | 33—206 |
| 1,889,921 | 12/1932 | Jakosky | 33—206 |
| 2,058,743 | 10/1936 | Trippe | 33—207 |
| 2,557,654 | 6/1951 | Hagner | 33—206 |
| 2,826,823 | 3/1958 | Hagner | 33—206 |
| 3,043,950 | 7/1962 | Keck | 240—25 |

LOUIS J. CAPOZI, *Primary Examiner.*